(12) United States Patent
Forster

(10) Patent No.: US 10,081,894 B2
(45) Date of Patent: Sep. 25, 2018

(54) MERCHANDISE TAGS INCORPORATING A DURABLE ANTENNA

(71) Applicant: Avery Dennison Corporation, Mentor, OH (US)

(72) Inventor: Ian James Forster, Essex (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/584,374

(22) Filed: Dec. 29, 2014

(65) Prior Publication Data

US 2015/0339566 A1    Nov. 26, 2015

Related U.S. Application Data

(60) Provisional application No. 62/002,344, filed on May 23, 2014.

(51) Int. Cl.
*G06K 19/06* (2006.01)
*D05B 23/00* (2006.01)
(Continued)

(52) U.S. Cl.
CPC ............ *D05B 23/00* (2013.01); *G06K 19/025* (2013.01); *G06K 19/027* (2013.01); *G06K 19/07749* (2013.01); *H01Q 1/2225* (2013.01)

(58) Field of Classification Search
CPC ............ G06K 19/07749; G06K 19/02; G06K 19/027; G06K 19/041; G06K 19/0717;
(Continued)

(56) References Cited

U.S. PATENT DOCUMENTS 7,298,343 B2   11/2007   Forster et al.
8,072,334 B2   12/2011   Forster et al.
(Continued)

FOREIGN PATENT DOCUMENTS

EP   2020654    2/2009
GB   2409615    6/2005

OTHER PUBLICATIONS

Masato Tanaka, Wearable microstrip antenna, Proceedings of IEICE General Conference 2006, B-1-173, Mar. 2006.*
(Continued)

*Primary Examiner* — Thien M Le
*Assistant Examiner* — Tae Kim
(74) *Attorney, Agent, or Firm* — Avery Dennison Retail Information Services, LLC

(57) ABSTRACT

Systems and methods are provided for labeling a piece of merchandise with a wireless communication device. In addition to a wireless communication device, the merchandise tag includes an associated label made of a washable fabric material. The wireless communication device is incorporated into the label and includes an RFID chip and a slot-loop hybrid antenna, with the antenna including a conductor sheet that defines a slot. The label is secured to a piece of merchandise at a sew line, with the sew line dividing the label into an upper portion and a lower portion. The RFID chip and the slot of the antenna, along with a relatively high conductance piece or portion of the conductor sheet, are positioned within the upper portion of the label, while a relatively low conductance piece or portion of the conductor sheet is positioned within the lower portion of the label.

7 Claims, 3 Drawing Sheets

(51) Int. Cl.
*H01Q 1/22* (2006.01)
*G06K 19/02* (2006.01)
*G06K 19/077* (2006.01)

(58) Field of Classification Search
CPC .......... G06K 19/073; G06K 19/07345; G06K 19/07758; G06K 19/07771; G06K 19/07796; G06K 19/07798; H01L 2224/16; H01L 2924/3011; H01Q 1/085; H01Q 1/22; H01Q 1/2225; H01Q 1/243; H01Q 1/273; H01Q 1/38; H01Q 7/00; H01Q 9/26; H01Q 9/42
USPC ........................................................ 235/492
See application file for complete search history.

(56) References Cited

U.S. PATENT DOCUMENTS

| | | | | |
|---|---|---|---|---|
| 2005/0012616 A1* | 1/2005 | Forster | ............... | G06K 19/0717 340/572.7 |
| 2005/0093677 A1* | 5/2005 | Forster | ............ | G06K 19/07749 340/10.1 |
| 2005/0093678 A1 | 5/2005 | Forster et al. | | |
| 2010/0188306 A1* | 7/2010 | Kitayoshi | .............. | H01Q 13/18 343/767 |
| 2011/0114734 A1* | 5/2011 | Tiedmann | .............. | G06K 19/02 235/492 |
| 2014/0263659 A1* | 9/2014 | Kervinen | ............. | G06K 19/027 235/488 |

OTHER PUBLICATIONS

International Preliminary Report on Patentability and Written Opinion dated Nov. 29, 2016 for International Application No. PCT/US2014/072527 filed Dec. 29, 2014.

International Search Report dated May 11, 2015 for International Application No. PCT/US2014/072527 filed Dec. 29, 2014.

* cited by examiner

MERCHANDISE TAGS INCORPORATING A DURABLE ANTENNA

CROSS-REFERENCE TO RELATED APPLICATION(S)

The present application claims priority from U.S. Provisional Application No. 62/002,344 filed May 23, 2014, which is incorporated by herein by reference in its entirety.

BACKGROUND

Field of the Disclosure

The present subject matter relates to merchandise tags. More particularly, the present subject matter relates to washable tags having a wireless communication device incorporated therein, with improved durability and resistance to fractures and breaks.

Description of Related Art

Devices incorporating wireless communication approaches including remote frequency identification ("RFID") technology are widely used for a variety of different applications, including incorporation into merchandise tags for inventory control, tracking, and security purposes. Such systems are well known in the retail industry, including in connection with clothing inventory control and security from theft and other losses.

RFID devices incorporated into a merchandise tag may have a variety of integrated components, among them an RFID chip containing data such as an identification code for the type of product and even for the exact piece of goods associated with a unique identification code. Other components may include an antenna electrically connected to the RFID chip, which is responsible for transmitting signals to and/or receiving signals from another RFID device, for example, an RFID reader system. The antenna may take any of a number of forms including, in some circumstances, a hybrid loop-slot antenna or slot-loop hybrid antenna, which is commonly referred to as a "sloop" antenna. Configurations of these types of hybrid or sloop antennas are shown in U.S. Pat. No. 7,298,343 and U.S. Pat. No. 8,072,334, both of which are incorporated herein by reference in their entirety.

Clothing tags are frequently subjected to stress, such as when the associated article of clothing is washed or folded or otherwise handled. Accordingly, it would be advantageous to provide a washable tag that is more durable and capable of being repeatedly washed, folded, or otherwise handled without the associated antenna fracturing or breaking or otherwise having the tag becoming irreparably damaged.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a merchandise tag includes a label formed of a fabric material, with a wireless communication device incorporated into the label. The wireless communication device includes an RFID chip and a slot-loop hybrid antenna electrically coupled to the RFID chip. The antenna includes a conductor sheet defining a slot. A sew line, at which location the label is to be secured to a piece of merchandise, divides the label into an upper portion and a lower portion. The RFID chip and the slot of the antenna are positioned within the upper portion of the label. The conductor sheet includes a relatively high conductance portion and a relatively low conductance portion, with the RFID chip being electrically coupled to and the slot being defined in the portion having the greater conductance.

In another aspect, a wireless communication device sized and configured for incorporation into a merchandise tag includes an RFID chip and a slot-loop hybrid antenna electrically coupled to the RFID chip. The antenna includes a conductor sheet defining a slot and having a relatively high conductance portion and a relatively low conductance portion, with the RFID chip being electrically coupled to and the slot being defined in the portion having the greater conductance.

In yet another aspect, a method of labeling a piece of merchandise includes providing a piece of merchandise and a merchandise tag. The merchandise tag includes a label formed of a fabric material, with a wireless communication device incorporated into the label. The wireless communication device includes an RFID chip and a slot-loop hybrid antenna electrically coupled to the RFID chip. The antenna includes a conductor sheet defining a slot. The merchandise tag is secured to the piece of merchandise at a sew line, which divides the label into an upper portion and a lower portion, with the RFID chip and the slot of the antenna being positioned within the upper portion of the label. At least a portion of the conductor sheet positioned within the lower portion of the label has a lesser conductance than at least a portion of the conductor sheet positioned within the upper portion of the label.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The merchandise tags described herein are both robust and washable and are of relatively low thickness. Having these properties, the tags are especially suitable for use as labels, patches, tags, decorative overlays and the like for garments or other pieces of merchandise. Garments can be subjected to processing, including washing and so-called stone washing during their processing or production. When thus used, the tags are robust and durable, especially with respect to potential breakage of the antenna of a wireless communication device incorporated into the tag. The present merchandise tags are capable of withstanding washing and other processes such as stone washing without having to incorporate material that adds excessive thickness, which would make the tags stiffer than desired, also impacting garment wearability.

Figure 1:
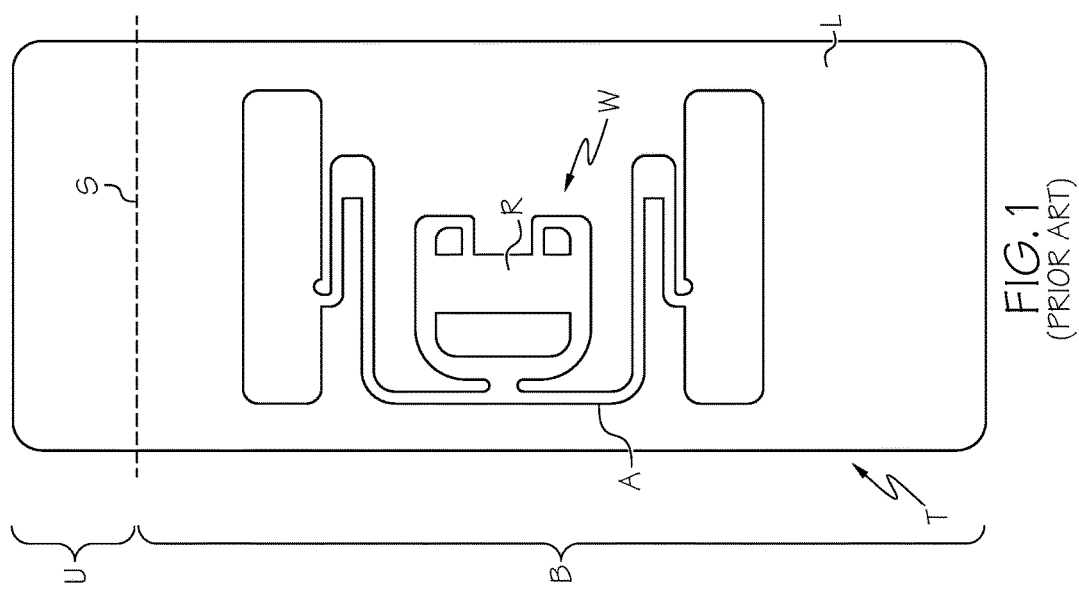
FIG. 1 is a top plan view of a merchandise tag according to conventional design.

Merchandise tags according to the present disclosure may address a number of problems. For example, one problem is disruption of the antenna of the wireless communication device, which may become broken or torn during manufacturing, processing, and use. FIG. 1 illustrates a merchandise tag T according to conventional design. The merchandise tag T includes a label L formed of a washable fabric material and a wireless communication device W, which includes an RFID chip R and an associated dipole-type antenna A. The merchandise tag T includes a sew line S, which represents the location at which the merchandise tag T is secured to a piece of merchandise, such as by a sewing or adhesion process. The sew line S is positioned adjacent to one end of the label L, thereby dividing the label L into an upper portion U and a lower portion B.

As shown in FIG. 1, the majority of the wireless communication device W, including the RFID chip R and the antenna A, is positioned within the lower portion B of the label L. During manufacturing, processing, and use of the associated piece of merchandise, the lower portion B of the label L is more likely to be damaged than the upper portion U (which is affixed to the merchandise). If the lower portion B of the label L becomes detached from the piece of merchandise at the sew line S, then the RFID chip R and the antenna A will be disassociated from the piece of merchandise, thereby becoming incapable of working as intended. Even lesser damage to or handling of the label L can irreparably damage the wireless communication device W, with the antenna A being of the dipole type that may be relatively thin and fragile and susceptible to fracture or breakage. In addition, the lower portion of the label L typically includes printed indicia, including barcoding and other electronic identifiers as well as trademarks and descriptive material and images. The presence of the chip R and antenna A frequently creates an unevenness that can distort such printed indicia.

Figure 2:
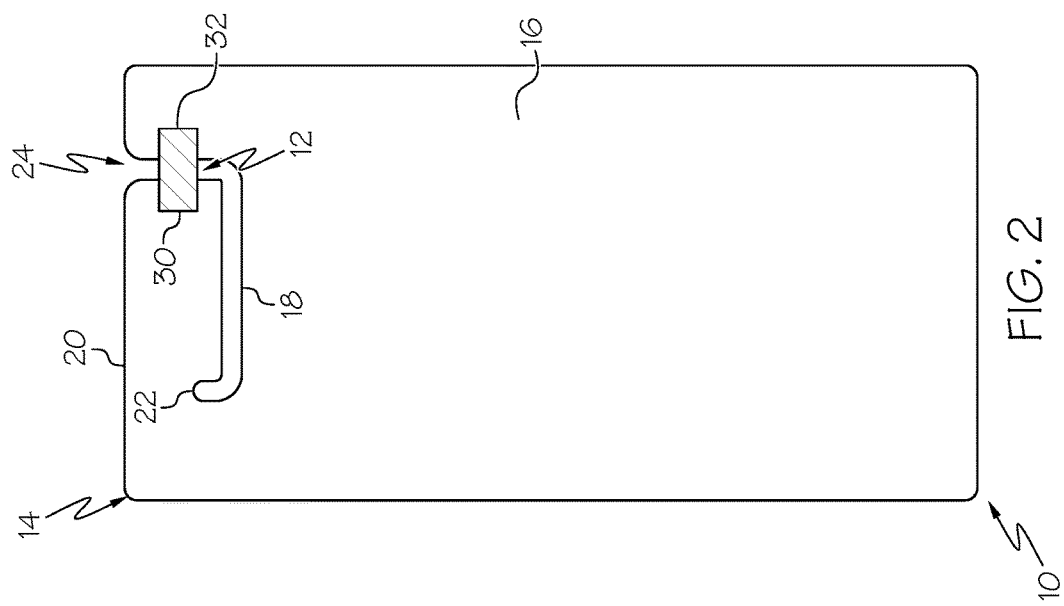
FIG. 2 is a top plan view of a wireless communication device suitable for incorporation into a merchandise tag according to an aspect of the present disclosure.

FIG. 2 illustrates a wireless communication device 10 according to the present disclosure. The wireless communication device includes an RFID chip 12, with an antenna 14 electrically coupled to the RFID chip 12. In the illustrated embodiment, the antenna 14 is of the hybrid loop-slot antenna type, generally referred to as a "sloop" antenna. The antenna 14 is formed of a conductor sheet 16 that defines a slot 18, with the slot 18 (along with the RFID chip 12) being an "active" component of the wireless communication device 10. In the illustrated embodiment, the conductor sheet 16 is generally rectangular, with the slot 18 being positioned at an upper edge or end 20 of the conductor sheet 16. Preferably, the conductor sheet 16 is formed of a relatively thin, electrically conductive material, such as a conductive foil. As illustrated, the slot 18 may extend between a closed end 22 and an open end 24 associated with the upper end or edge 20 of the conductor sheet 16. In one embodiment, the slot 18 may be cut from the sheet of conductive material of the conductor sheet 16 in such a way that orients the slot 18 substantially horizontally (in the orientation of FIG. 2) instead of vertically (as the antenna A is oriented in FIG. 1), such that the slot 18 is positioned adjacent to the upper end or edge 20 of the conductor sheet 16. For example, it may be advantageous (for reasons which will be described in greater detail herein) for the slot 18 to be defined in the upper 10-20% of the height of the conductor sheet 16 (in the orientation of FIG. 2).

Figure 4:
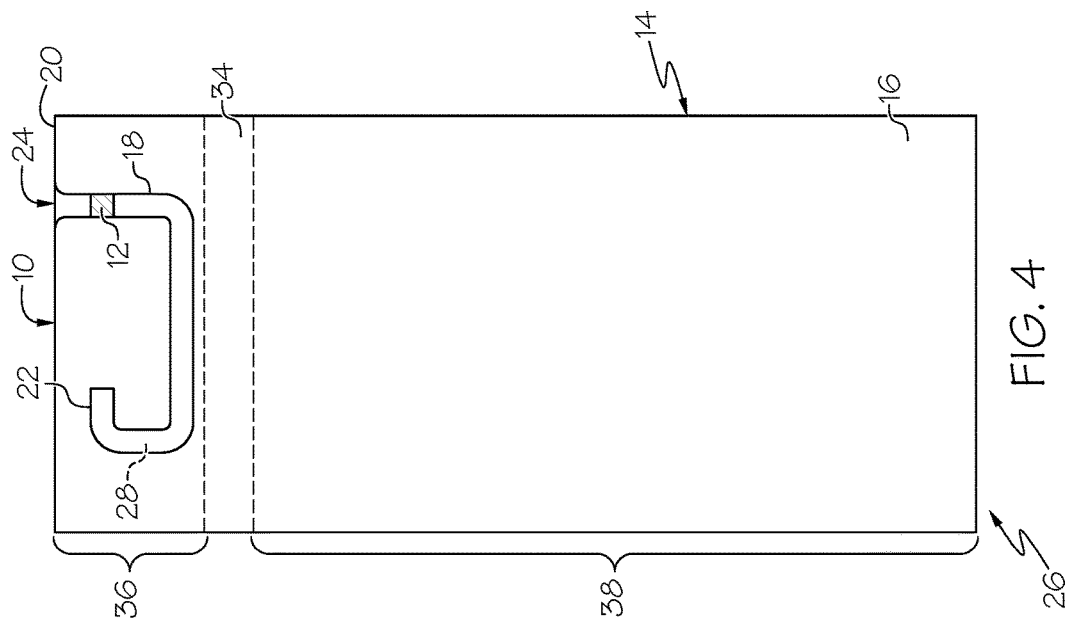
FIG. 4 is a bottom plan view of the merchandise tag of FIG. 3.
Figure 3:
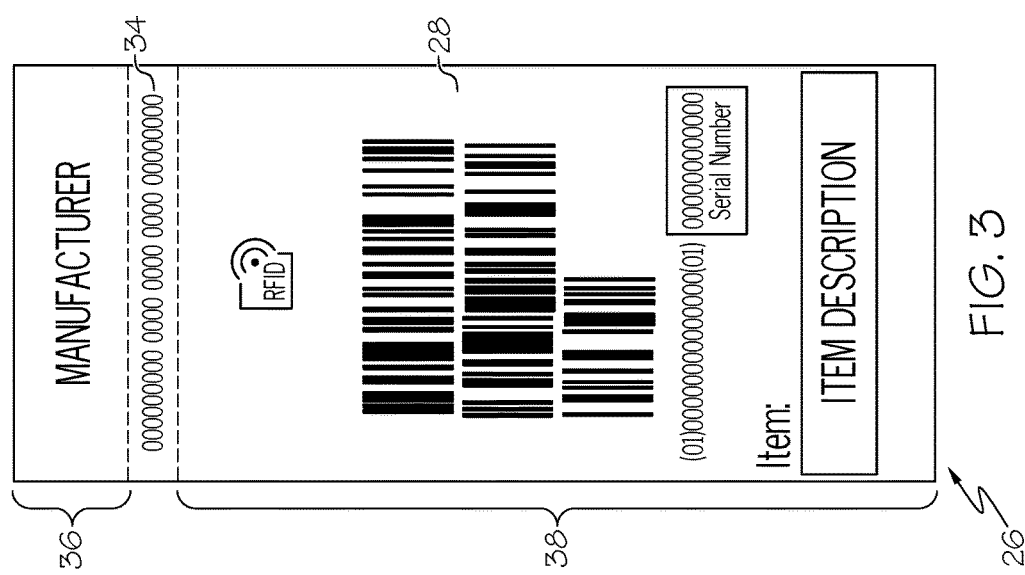
FIG. 3 is a top plan view of a merchandise tag according to an aspect of the present disclosure.

Preferably, the conductor sheet 16 is relatively large to improve the performance of the sloop antenna 14. For example, the conductor sheet 16 may have a height and a width that are comparable to the height and width of the label of the associated merchandise tag. For example, a merchandise tag 26 incorporating the wireless communication device 10 of FIG. 2 is shown in FIGS. 3 and 4, with FIG. 4 showing the conductor sheet 16 having an outer perimeter with a shape, width, and height that are approximately or substantially the same as the respective shape, width, and height of the associated fabric label 28. FIGS. 3 and 4 illustrate an embodiment in which the conductor sheet 16 is substantially identical in size and shape (except for the presence of the slot 18) to the fabric label 28, with the height of the conductor sheet 16 and the label 28 (i.e., the vertical dimension of the label 28 and the conductor sheet 16 in the orientation of FIGS. 3 and 4) being greater than the width of the conductor sheet 16 and the label 28 (i.e., the horizontal dimension of the label 28 and the conductor sheet 16 in the orientation of FIGS. 3 and 4) to provide a substantially rectangular label 28 and wireless communication device 10. While the illustrated embodiment may be advantageous, it is also within the scope of the present disclosure for the height of the label 28 and the conductor sheet 16 to be less than the width or for the height and width of the label 28 and the conductor sheet 16 to be substantially the same. Further, it is also within the scope of the present disclosure for the label 28 and the conductor sheet 16 to be substantially non-rectangular and/or for the label 28 to have a different size and shape than the conductor sheet 16, including an embodiment in which the conductor sheet 16 extends beyond the perimeter of the label 28.

In the illustrated embodiment, the merchandise tag 26 is formed of a single fabric label 28 secured to a wireless communication device 10. In other embodiments, a plurality of fabric layers may be provided, such as a front fabric layer and a rear fabric layer, with the wireless communication device 10 sandwiched or positioned between the two fabric layers. As shown in FIG. 3, the fabric label 28 may be provided with information (e.g., care instructions and identifying information) and symbols printed thereon. In that case, a relatively large conductor sheet 16 may improve the appearance of the resulting merchandise tag 26, as the conductor sheet 16 provides a flat surface that may be more rigid than the associated label 28 (which is typically formed of a thin, flexible fabric material), thereby decreasing the amount of distortion of anything printed on the fabric label 28, such as indicia in the nature of electronic identifiers, trademarks, descriptive material and text, and descriptive and decorative images.

A relatively large conductor sheet 16 may also improve the operation of the wireless communication device 10 and sloop antenna 14 in a number of ways. For example, it may be more difficult to break a large conductor sheet 16 than a thin line or other structure in a typical dipole-type antenna A, such as illustrated in FIG. 1. Additionally, breakage of a large conductor sheet 16 is less likely to cause a critical reduction in the functionality of the antenna 14 and its ability to communicate wirelessly. For example, a horizontal break through the middle of the conductor sheet 16 of FIG. 2 would result in somewhat reduced performance, whereas the same horizontal break through the middle of the wireless communication device W of FIG. 1 would completely destroy and disable the prior art antenna A. A relatively large conductor sheet 16 may also serve to strengthen and protect the joint between the antenna 14 and the RFID chip 12.

Turning back now to the RFID chip 12, it may take any of a number of forms (including those of the type commonly referred to as a "chip" or a "strap" by one of ordinary skill in the art), including any of a number of possible components and configured to perform any of a number of possible functions. For example, in one embodiment, the RFID chip 12 includes an integrated circuit for controlling RF communication and other functions of the wireless communication device 10. In the illustrated embodiment, two ends or points 30 and 32 of the RFID chip 12 are connected to the conductor sheet 16 at opposite sides of the slot 18, which serves to electrically couple the RFID chip 12 to the conductor sheet 16. In this particular embodiment, the RFID chip 12 is positioned adjacent to the open end 24 of the slot 18 and the upper end or edge 20 of the conductor sheet 16, with the RFID chip 12 having a larger dimension that is oriented horizontally (in the orientation of FIG. 2) instead of vertically (as the RFID chip R is oriented in FIG. 1). In one embodiment, as shown in FIGS. 2 and 4, the RFID chip 12 may be positioned directly adjacent to the upper end or edge 20 of the conductor sheet 16, such as being positioned entirely within the upper 10-20% of the height of the conductor sheet 16 (in the orientation of FIGS. 2 and 4).

FIG. 4 illustrates the effect of positioning the slot 18 and the RFID chip 12 adjacent to one of the ends or edges (illustrated as the upper edge or end 20) of the conductor sheet 16. In particular, by positioning the slot 18 and the RFID chip 12 adjacent to one of the ends or edges of the conductor sheet 16, the slot 18 and the RFID chip 12 (i.e., the "active" components of the wireless communication device 10) may be positioned entirely on one side of the sew line 34 (shown in broken lines in FIG. 4) of the merchandise tag 26. In the illustrated embodiment, the sew line 34 effectively divides the merchandise tag 26, the label 28, and the wireless communication device 10 into an upper portion 36 (in which the slot 18 and the RFID chip 12 are located) and a lower portion 38. The lower portion 38 is intended to be viewed by a customer or user, so it may be preferred for the sew line 34 to be oriented in a way that results in a lower portion 38 that is larger than the upper portion 36, which allows for more information to be printed or affixed or otherwise displayed on the lower portion 38 of the label 28. As such, the upper portion 36 may be referred to as the minor or fixed portion of the merchandise tag 26 (because it is the portion that is affixed to the merchandise), while the lower portion 38 may be referred to as the major or free portion.

Positioning the slot 18 and the RFID chip 12 in the upper portion 36 of the merchandise tag 26 significantly increases the durability of the wireless communication device 10. For one, the upper portion 36 may be fixedly secured to the piece of merchandise, whereas the lower portion 38 is typically unsecured to the piece of merchandise, allowing the lower portion 38 to freely bend or deform during manufacture, processing, and use. Hence, the lower portion 38 is subject to more stress, pressure, and impact than the upper portion 36. In the illustrated embodiment, the conductor sheet 16 extends from the upper portion 36, into the sew line 34, and into the lower portion 38 in order to increase its size (for reasons described above in greater detail); however, as noted above, damaging or even breaking off a portion of the conductor sheet 16 does not prevent the wireless communication device 10 from operating, as the RFID chip 12, the slot 18, and the portion of the conductor sheet 16 surrounding the slot 18 remain intact in the upper portion 36 and operational.

Figure 5:
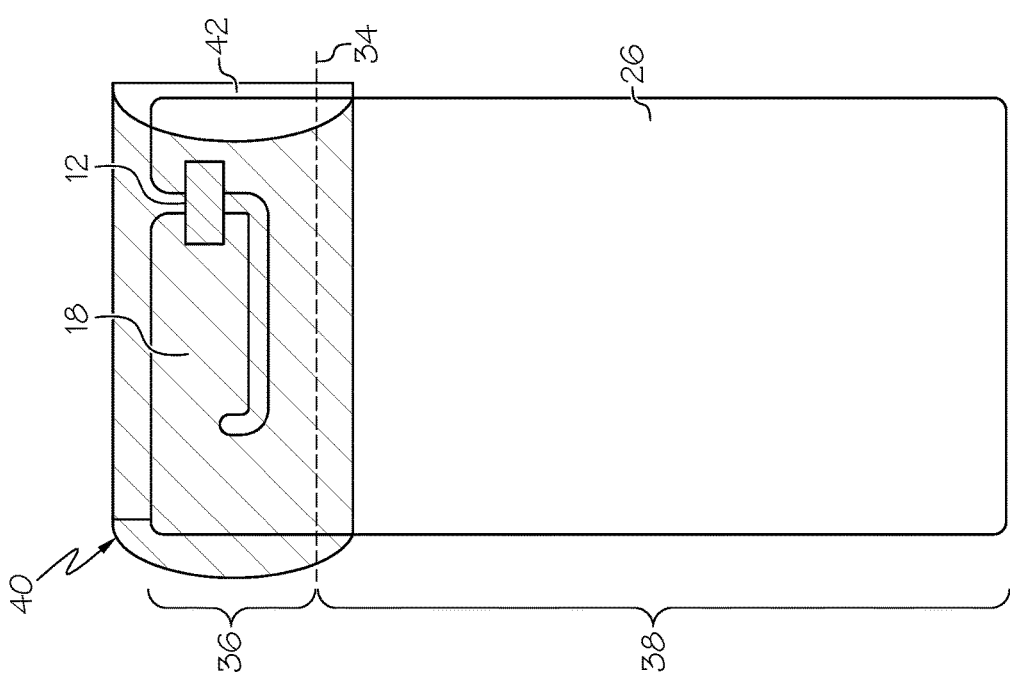
FIG. 5 is a rear perspective view of the merchandise tag of FIG. 3, secured to a piece of merchandise.

Additionally, positioning the RFID chip 12 and the slot 18 within the upper portion 36 may allow for the piece of merchandise itself to help protect the RFID chip 12 and the slot 18. For example, if the piece of merchandise 40 includes a seam or neckline or waistband 42 (FIG. 5), then the merchandise tag 26 may be secured to the piece of merchandise 40 in such a way that the upper portion 36 of the merchandise tag 26 (and, hence, the RFID chip 12 and the slot 18) are positioned within the seam or neckline or waistband 42. The seam or neckline or waistband 42 may be defined by material or fabric folded onto itself, which may be sealed shut by the sew line 34 when the merchandise tag 26 is secured to the piece of merchandise 40 (or may be separately sealed shut). This formation of the piece of merchandise 40 effectively creates a pocket or sleeve in which the upper portion 36 of the merchandise tag 26 (and, hence, the RFID chip 12 and the slot 18) may be positioned, which cushions and protects the RFID chip 12 and the slot 18.

Furthermore, positioning the RFID chip 12 and the slot 18 within the upper portion 36 of the merchandise tag 26 may more readily allow the use of a support material to further protect the RFID chip 12 and the slot 18. A customer or user is typically more accustomed to the seam or neckline or waistband 42 of a piece of merchandise 40 being more rigid or less flexible than the portion of an associated merchandise tag 26 positioned outside of the seam or neckline or waistband 42 (i.e., the lower portion 38). Thus, the addition of a support material having a greater stiffness or rigidity than the fabric of the label 28 to all or a portion of one or both sides of the upper portion 36 and/or the sew line 34 provides additional protection for the RFID chip 12 and the slot 18 without subverting the expectations of the customer or user as to the relatively softness and flexibility of a seam or neckline or waistband 42 and the free portion 38 of an associated merchandise tag 26 positioned outside of the seam or neckline or waistband 42. Examples of the support material include a polyethylene terephthalate ("PET") film attached by any suitable approach, such as application of a sealant, adhesive, heat, pressure, and/or sonic sealing or as an over-laminate or the like. An additional advantage of a support material is that it may help to prevent or limit the ability of water or chemical agents, including detergents and processing chemicals, to come into contact with and damage the RFID chip 12 and the slot 18 (e.g., when the piece of merchandise 40 is being manufactured, washed or cleaned).

Figure 6:
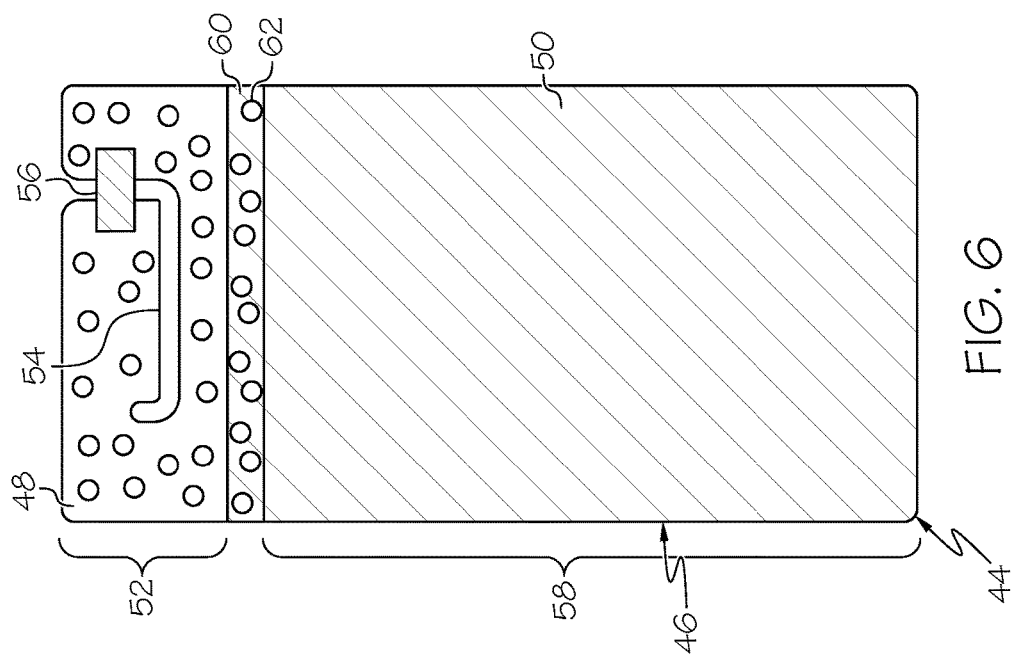
FIG. 6 is a rear perspective view of an alternative embodiment of a wireless communication device according to an aspect of the present disclosure.

In one embodiment, the support material may define and replace a portion of the conductor sheet. For example, FIG. 6 illustrates an embodiment of a wireless communication device 44 in which a composite conductor sheet 46 is formed of two separate conductive sub-sheets or pieces 48 and 50. The first piece 48 of the conductor sheet 46 may define at least the upper portion 52 of the conductor sheet 46 (i.e., the portion of the conductor sheet 46 in which a slot 54 is defined and the RFID chip 56 is located) and be formed of the relatively inflexible support material. The second piece 50 of the conductor sheet 46 may be formed of a relatively flexible material (such as a fabric) and define at least the lower portion 58 of the conductor sheet 46 (i.e., the portion that is typically unsecured to the associated piece of merchandise). If so provided, the two pieces 48 and 50 of the conductor sheet 46 may be secured and electrically coupled together at an overlapping section 60, which may correspond generally to the location of the sew line 62 (as in FIG. 6) or may be positioned away from the sew line 62. Other than the composite conductor sheet 46, the wireless communication device 44 of FIG. 6 may be configured and operate according to the foregoing description of the wireless communication device 10 of FIG. 2, with merchandise tags incorporating the wireless communication device 44 of FIG. 6 being configured and operating according to the foregoing description of the merchandise tag 26 of FIGS. 3, 4 and 5.

In addition to different portions of the conductor sheet 16, 46 having different tactile properties, it is also within the scope of the present disclosure for different portions of the conductor sheet 16, 46 to have different functional properties. Imparting different functional properties to different portions of the conductor sheet 16, 46 may be achieved using any of a number of approaches. For example, the conductor sheet 16, 46 may be formed of a single piece of material, with the two portions being treated or finished differently to cause a difference in one or more of their functional properties. In another embodiment, the conductor sheet 16, 46 may be formed of two pieces having different functional properties (e.g., different conductance), with a configuration as shown in FIG. 6 or with a different configuration.

For example, one portion of the conductor sheet 16, 46 may have a greater conductance than another portion of the conductor sheet 16, 46. In one embodiment, a portion of the conductor sheet 16, 46 corresponding generally to the upper portion 36 has a relatively high conductance, while a portion of the conductor sheet 16, 46 corresponding generally to the lower portion 38 has a relatively low conductance. This may be advantageous in the event that the lower portion 38 detaches from the merchandise, because the remaining portion of the conductor sheet 16, 46 (i.e., the relatively high conductance portion) will continue serving as an effective antenna, albeit one with a possibly decreased read range. Even with a decreased read range, the wireless communication device 10, 44 may still be used for a number of purposes, including monitoring product returns to a retailer.

A relatively high conductance portion or piece of the conductor sheet 16, 46 may be formed of any of a number of materials, such as an aluminum material or other relatively durable, metallic film, sheeting or the like. A relatively low conductance portion or piece of the conductor sheet 16, 46 may also be formed of any of a number of materials. If the relatively low conductance portion or piece corresponds generally to the lower portion 38, it may be preferred for it to be formed of a material that is more flexible and softer than the material used to form the other portion or piece. For example, the relatively low conductance portion or piece may be formed of a fabric, which may be a conductive fabric or a non-conductive fabric. In the case of a fabric that is not itself inherently conductive, at least a portion of the otherwise non-conductive fabric may be coated or otherwise treated (e.g., using vapor deposition, impregnation, electroless plating or the like) with a conductive material or agent, such as an ink containing carbon, silver particles or other conductive particles.

In one embodiment in which the relatively low conductance portion or piece corresponds generally to the lower portion 38, the relatively low conductance portion or piece is formed of a water-disintegrable material, such as paper or other cellulosic material at least partially coated, impregnated or treated with a conductive material (e.g., a conductive ink or foil). Upon washing the associated piece of merchandise, the relatively low conductance portion or piece of the conductor sheet 16, 46 will disintegrate or otherwise dissociate from the remainder of the conductor sheet 16, 46. See for example U.S. Pat. No. 7,629,888 which is assigned to the current assignee of the present application and which included herein by reference thereto. When incorporated into a merchandise tag of an article of clothing, such a relatively low conductance portion or piece of the conductor sheet 16, 46 is sufficiently flexible and soft as to be comfortable when a consumer is trying on or otherwise handling the clothing. Typically, after the customer has purchased the article of clothing and washed it, the relatively low conductance portion or piece of the conductor sheet 16, 46 disintegrates, decreasing the read range of the wireless communication device 10, 44. However, as noted above, longer range functionality may only be required prior to purchase (e.g., as a security feature to prevent theft of the merchandise), while a diminished range following purchase may be acceptable for product returns or the like.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A merchandise tag comprising:
   a label formed of a fabric material;
   a wireless communication device incorporated into the label and including
      an RFID chip, and
      a slot-loop hybrid antenna electrically coupled to the RFID chip and including a conductor sheet defining a slot; and
   a sew line at which the label is secured to a piece of merchandise, wherein
   the sew line divides the label into an upper portion and a lower portion,
   the RFID chip and the slot of the antenna are positioned within the upper portion of the label, and
   the conductor sheet includes a relatively high conductance portion and a relatively low conductance portion, with the RFID chip being electrically coupled to and the slot being defined in the portion having the greater conductance and only the portion of the conductor sheet having a relatively low conductance is formed of a conductive fabric.

2. The merchandise tag of claim 1, wherein the relatively high and relatively low conductance portions of the conductor sheet are separate pieces.

3. The merchandise tag of claim 1, wherein the portion of the conductor sheet having a relatively low conductance is a combination of a non-conductive material and a conductive material, the non-conductive material being at least partially coated, impregnated or treated with the conductive material.

4. The merchandise tag of claim 3, wherein the conductive material is an ink containing carbon, silver particles or other conductive particles.

5. The merchandise tag of claim 1, wherein the portion of the conductor sheet having a relatively low conductance is formed of a water disintegrable material.

6. The merchandise tag of claim 5, wherein the water disintegrable material is paper or other cellulosic material at least partially coated, impregnated or treated with a conductive material.

7. A method for labeling a piece of merchandise, comprising:
   providing a piece of merchandise;
   providing a merchandise tag including a label and a wireless communication device incorporated into the label, the wireless communication device including an RFID chip and a slot-loop hybrid antenna electrically coupled to the RFID chip and including a conductor sheet defining a slot; and
   securing the merchandise tag to the piece of merchandise at a sew line, which divides the label into an upper portion and a lower portion, wherein the merchandise tag is secured to the piece of merchandise such that the RFID chip and the slot of the antenna are positioned within the upper portion of the label, and
   at least a portion of the conductor sheet positioned within the lower portion of the label has a lesser conductance than at least a portion of the conductor sheet positioned within the upper portion of the label and only the portion of the conductor sheet having a lesser conductance is formed of a conductive fabric.

\* \* \* \* \*